(12) United States Patent
Puniello et al.

(10) Patent No.: US 7,223,085 B2
(45) Date of Patent: May 29, 2007

(54) APPARATUS AND METHOD FOR MOLDING GOLF BALLS

(75) Inventors: Paul A. Puniello, Bristol, RI (US); Robert A. Wilson, Sagamore, MA (US)

(73) Assignee: Acushnet Company, Fairhaven, MA (US)

( * ) Notice: Subject to any disclaimer, the term of this patent is extended or adjusted under 35 U.S.C. 154(b) by 36 days.

(21) Appl. No.: 11/153,320

(22) Filed: Jun. 16, 2005

(65) Prior Publication Data

US 2005/0244530 A1 Nov. 3, 2005

Related U.S. Application Data

(62) Division of application No. 09/764,110, filed on Jan. 19, 2001, now abandoned.

(51) Int. Cl.
*B29C 45/14* (2006.01)
*B29C 70/70* (2006.01)
(52) U.S. Cl. .................. 425/116; 425/577; 425/812
(58) Field of Classification Search ........... 425/116, 425/812, 577
See application file for complete search history.

(56) References Cited

U.S. PATENT DOCUMENTS 3,068,522 A * 12/1962 Nickerson et al. ......... 264/275
5,458,473 A * 10/1995 Banji ...................... 425/116
5,849,237 A * 12/1998 Inoue ...................... 264/319
5,882,567 A * 3/1999 Cavallaro et al. .......... 264/255
6,129,881 A * 10/2000 Puniello .................. 264/278
6,877,974 B2 * 4/2005 Puniello et al. ........... 425/116

FOREIGN PATENT DOCUMENTS

JP 08323772 A * 12/1996

OTHER PUBLICATIONS

Machine translation of JP08323772A obtained from the JPO website.*

* cited by examiner

*Primary Examiner*—Robert B. Davis
(74) *Attorney, Agent, or Firm*—Bingham McCutchen LLP

(57) ABSTRACT

The present invention is directed to a mold and method for forming a golf ball with at least a core. The mold and method comprise or use members with projections for forming multiple dimples on the core. The members can be retractable pins or sleeves or vent pins. In the case of the retractable pins, sets of pins with multiple dimple projections on the ends thereof are used to center the golf ball core within the mold. The members can have circular or non-circular cross-sections so that the dimple-forming projections can conform to any dimple pattern.

17 Claims, 13 Drawing Sheets

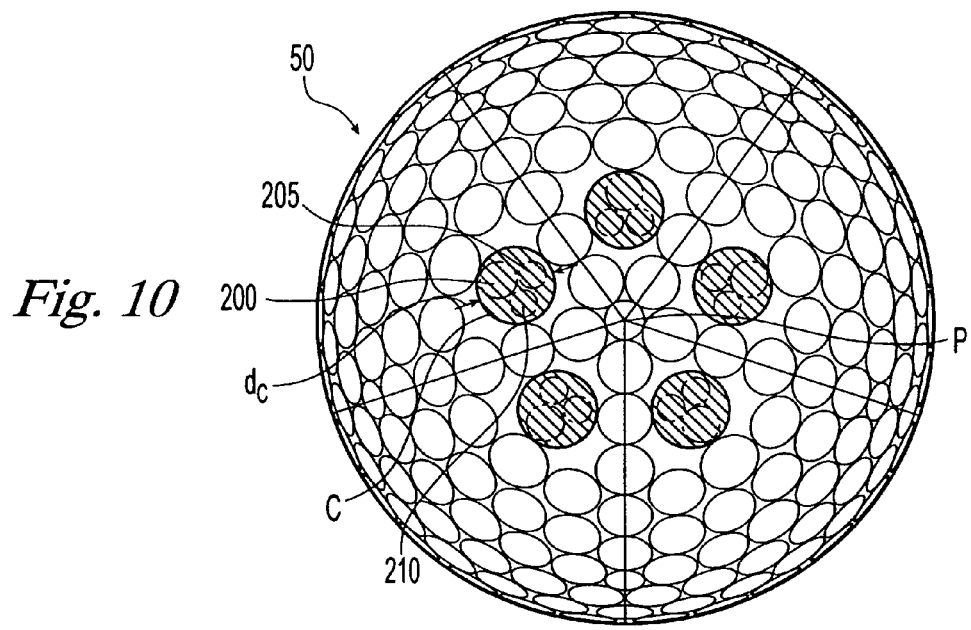
*Fig. 10*
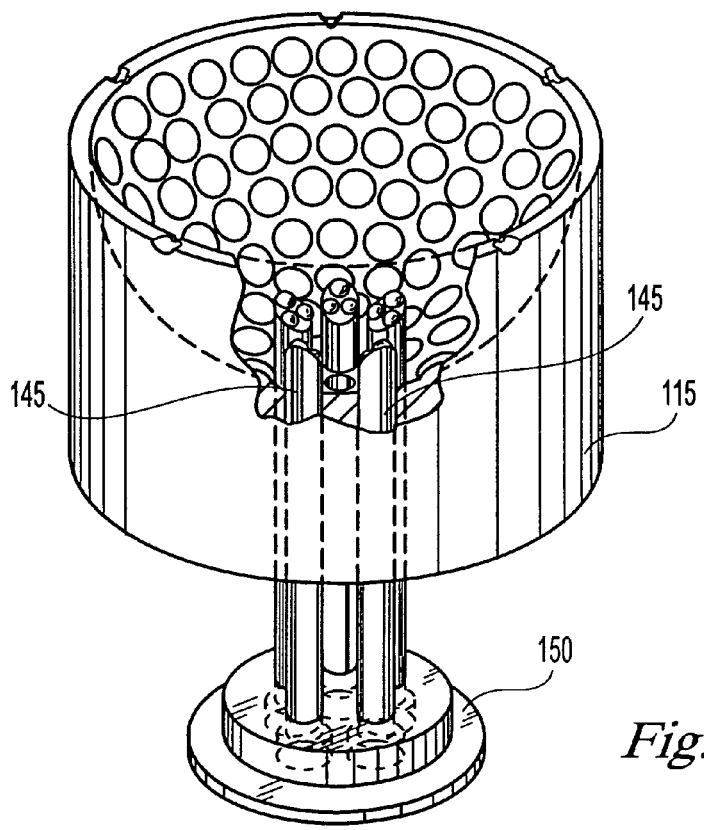
*Fig. 7*
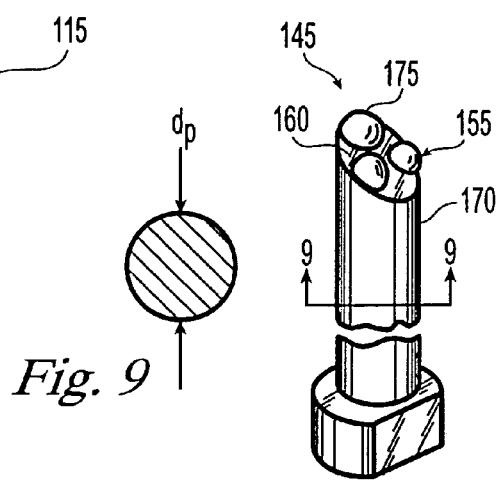
*Fig. 9*
*Fig. 8*

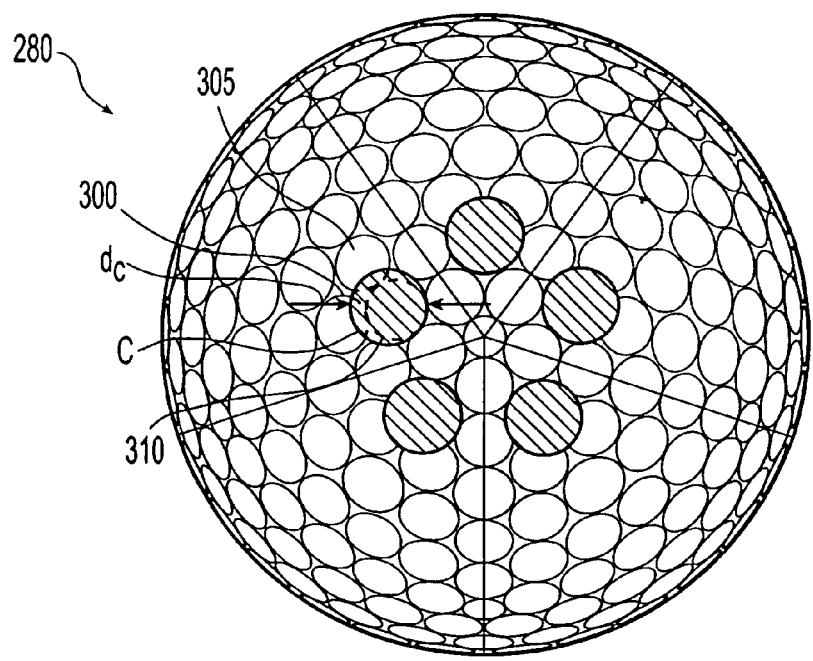
Fig. 16
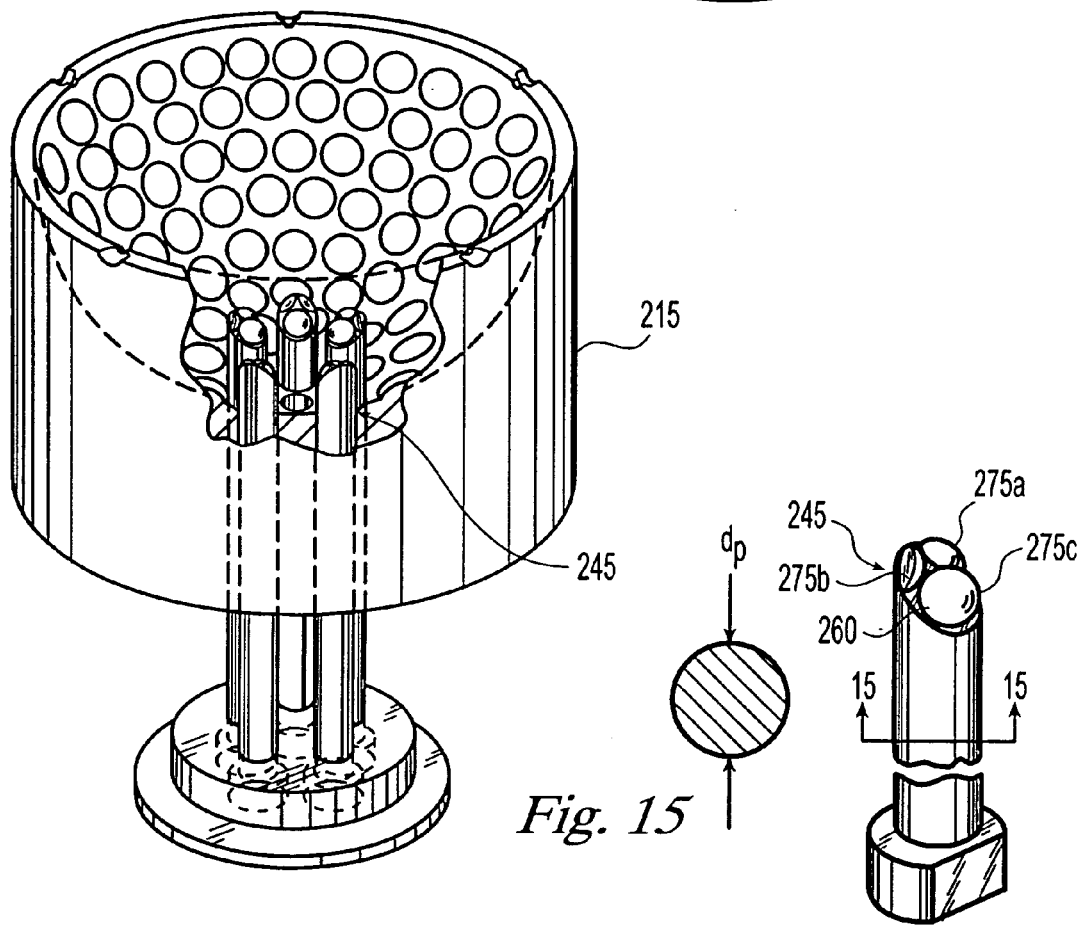
Fig. 13
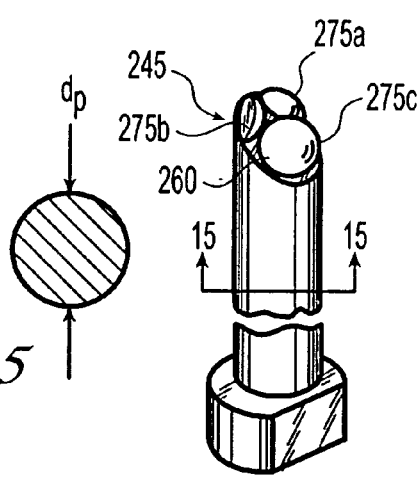
Fig. 15
Fig. 14

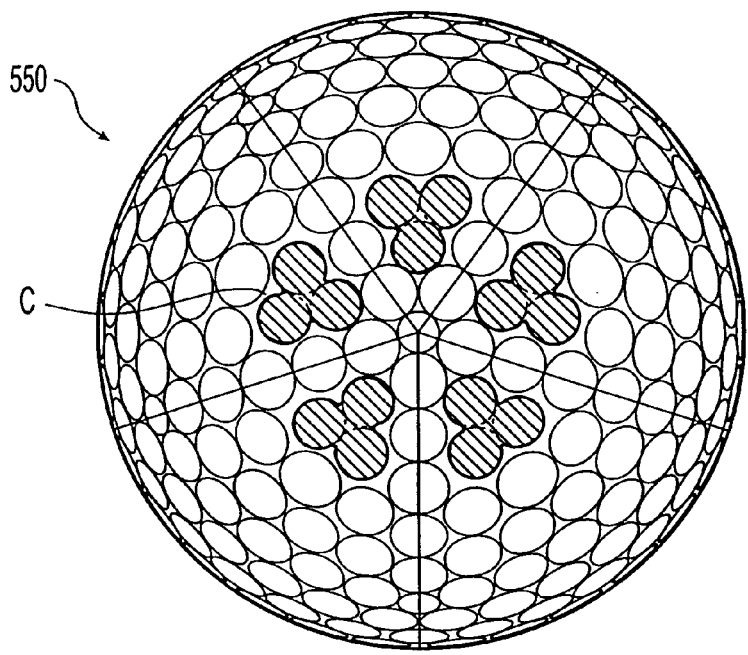
*Fig. 20*
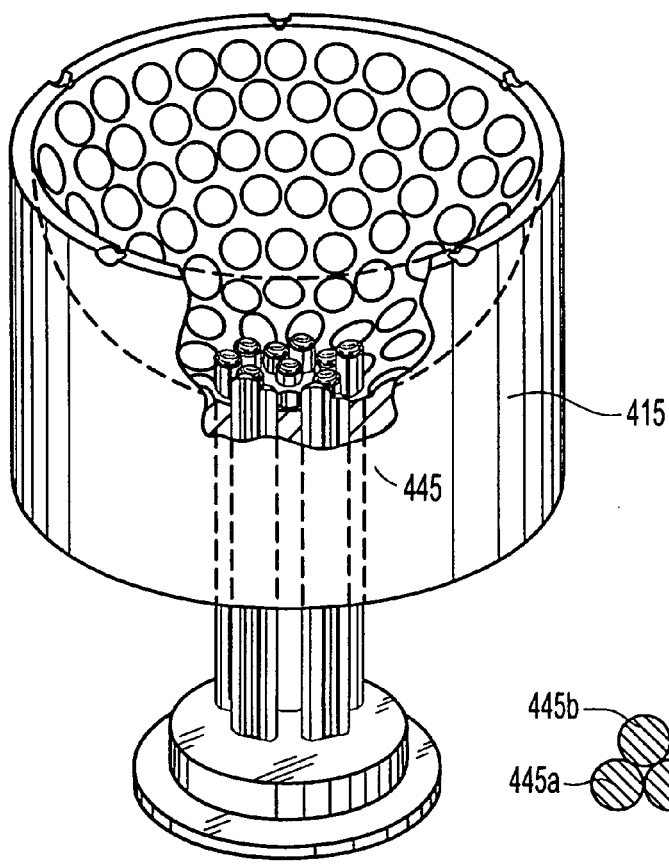
*Fig. 17*
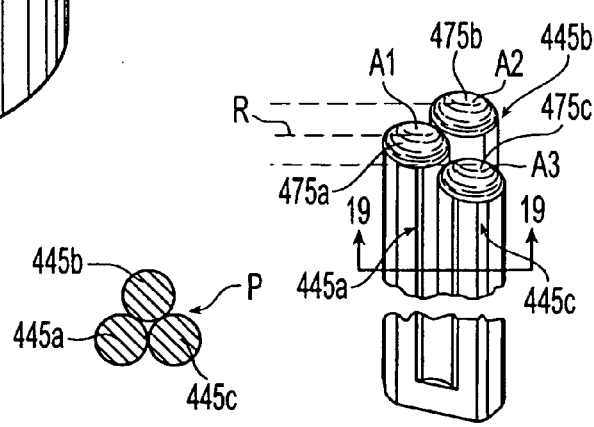
*Fig. 19*   *Fig. 18*

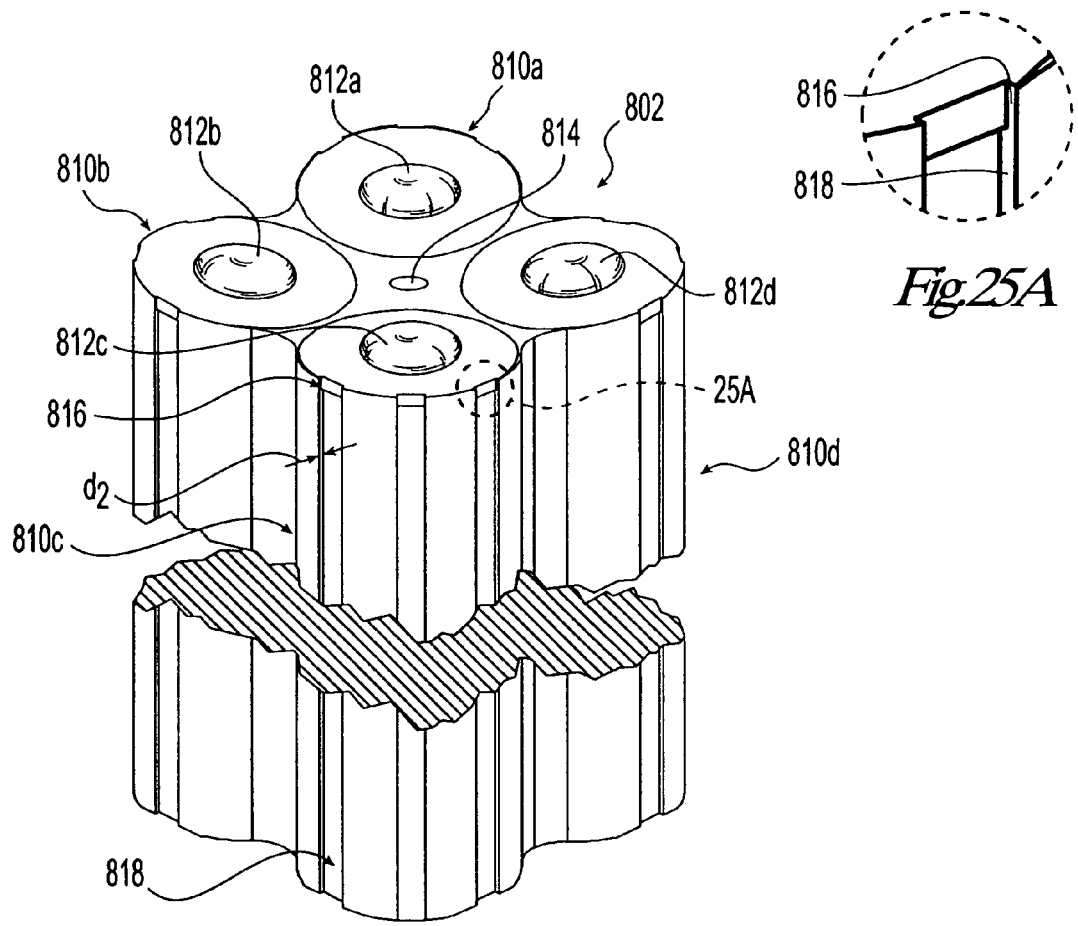
*Fig. 25*
*Fig.25A*
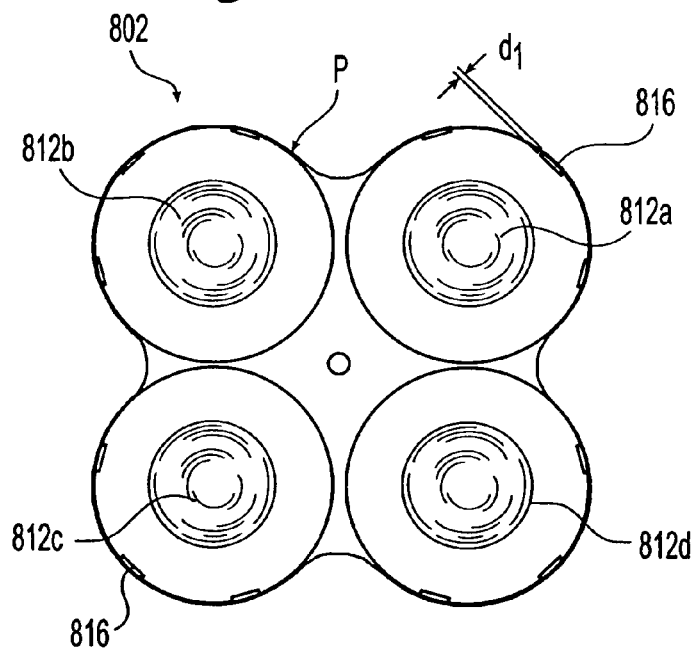
*Fig. 26*

APPARATUS AND METHOD FOR MOLDING GOLF BALLS

This application is a divisional application of U.S. patent application Ser. No. 09/764,110, filed Jan. 19, 2001 now abandoned, the entire disclosure of which is incorporated by reference herein.

FIELD OF THE INVENTION

This invention relates generally to the manufacture of golf balls, and more particularly, to an apparatus and method for molding golf balls including improved components.

BACKGROUND OF THE INVENTION

Conventional golf balls generally include a core surrounded by a cover. The cover forms a spherical outer surface of the ball and the surface includes a plurality of dimples. Typically the term "land" means the area of the outer surface of the ball not covered with dimples so that the land area is the outer surface of the ball between dimples.

Conventional dimples are circular depressions that act to reduce drag and increase lift. By using dimples to decrease drag and increase lift, golf ball flight distances have increased. The circumference of each dimple is the edge formed where the dimple wall slopes away from or intersects the land area of the outer surface. Since the geometry of the dimple principally determines ball drag and lift, conventional dimple patterns have been designed to optimize dimple geometry to reduce drag and increase lift.

Injection molding is a conventional method for forming the cover or an intermediate layer. According to well-known techniques, injection molding generally utilizes a mold and an injection unit. Referring to FIG. 1, a lower mold half 5 of a conventional injection mold is shown. The lower mold half fits into a bottom mold plate (not shown) and defines a hemispherical molding cavity 10 for receiving the core. The plate defines a runner system (not shown) for transporting a molten, cover material to one or more gates 15. The gates 15 allow the material to enter the cavity 10 from the runner system.

The mold also includes a plurality of separate, retractable pins 20; a vent pin (not shown) and a cluster block 25. The cluster block 25 defines bores for each pin 20 so that the pins extend therethrough and are affixed thereto. The pins 20 and the vent pin contact the core in generally the pole area of the core. Typically, the outer surface of the mold m cavity includes a plurality of hemispherical projections 30 for forming the majority of the cavity includes a plurality of hemispherical projections 30 for forming the majority of the dimples on the ball. The vent pin usually does not move and typically includes a free end shaped to form a dimple or land area depending on its location with respect to the dimple pattern being formed. An upper mold half and top plate of a similar configuration are also used.

One molding cycle for forming a golf ball includes a number of steps. When the top and bottom plates and lower and upper mold halves are separated, the core is placed within the bottom hemispherical molding cavity 10 on the pins 20, and the mold plates are closed to form a spherical cavity around the core. The pins center the core in the spherical cavity during molding. Then, the injection unit forces the molten, cover material through the runner system and gates into the molding cavity, until the cavity is filled and the material surrounds the core. The pins begin to retract as the material comes into close proximity to the pins. The material flows and fills the apertures in the material caused by the pins. As the material cools, it solidifies in the shape of the molding cavity around the core to form the golf ball. When the material is sufficiently cool, the mold plates and mold halves are again separated and the retractable pins are extended to separate the formed golf ball from the outer surface of the cavity also known as ejecting the ball from the mold. Then, mold is made ready for another molding cycle.

The retractable pins are located where a dimple or land area will be formed on the ball. If the retractable pins are located in dimple spaces, which are shaded areas 35 in FIG. 2, the free ends are substantially hemisphere-shaped (as shown in FIG. 1). In the retracted position during molding, each hemisphere-shaped, free end forms a single dimple in the outer surface of the ball. If the retractable pin is located in the land area, each such free end is shaped like the land area. As a result, in the retracted position during molding, these free ends form the associated, land areas. There are several drawbacks to these configurations.

Generally, golf balls have 300 to 500 circular dimples with a conventional sized dimple having a diameter that ranges from about 0.120 inches to about 0:180 inches. The retractable pins have similar dimensions at the free end to form the dimples. This leads to small surface areas at the free ends for each of the retractable pins. During ejection, since the free end surface area of each retractable pin is so small, the force each pin exerts on the ball is great. Accordingly, concentrated, high stresses are applied to the ball by the pins during ejection. These stresses can damage the ball in these areas so that extensive post-mold finishing, such as vibration tumbling, is done to make the balls playable. This is undesirable. In addition, the retractable pins slide with respect to the mold halves. This sliding forms "witness lines" about the pins in the retracted position. The clearance between the pins and the mold that causes these witness lines is about 0.0005 to 0.001 inches.

Another drawback is related to material flow during injection. When the material contacts the pins during molding, the pins are colder than the molten material. As a result, the molten material contacts the pins and begins to solidify about the pins, and the remaining molten material forms the cover. This also results in the formation of witness lines.

During retraction of the pins, when the material is packed around the pins, the pins can draw the material into the pin clearance between the pin and the mold. This material is often referred to as "flash material." Flash material can also be formed when there is wear between the pins and the mold.

Post-mold finishing is conducted to remove the witness lines and flash material. Finishing to remove witness lines and flash on the dimple circumference can cause uncontrolled rounding of the dimple edges that can alter the flight characteristics of the ball undesirably. One way to reduce forming such material on the dimple circumference is to configure the pin so that the diameter of the pin is greater than the maximum dimple diameter. Such a mold is disclosed in Japanese Publication No. 61-213068. However, this mold has the drawback of requiring significant ejection force as discussed above.

An alternative to centering the core on pins throughout molding is disclosed in U.S. Pat. No. 3,068,552 entitled "Method and Apparatus for Molding Covers on Spherical Bodies" to Nickerson et al. This patent discloses a molding press with hemispherical cavities and a horizontally movable, retractable seat with an inner curved surface with the same radius of curvature as that of the wall of the cavity. The seat further includes a multiplicity of rectangular or rounded projections to form the checkered or dimpled outer surface on the completed golf ball. The patent further requires that the area of the curved surface of the seat be within certain limits; i.e., not more than 40% nor less than about 10% of that of the complete cavity wall and hence that of the spherical resilient, wound core. In the extended position, each retractable seat holds the core in an eccentric position. During molding, the patent discloses the core is moved from the eccentric position to the center of the mold. One drawback is that beginning in the eccentric position, it would be difficult to complete molding with a centered core. This would likely be partially due to gravity acting on the core during molding and moving the core downward. Another drawback is that no vent is shown in the seat, without this vent air would be trapped in the seat during molding and would create a void in the cover that is undesirable.

Consequently, a need exists for an improved molding apparatus and method for manufacturing a golf ball. The apparatus and method should decrease the likelihood of damaging the cover during ejection, and allow formation of the cover in such a way that post-mold finishing minimally changes the dimple circumference and requires less time than in conventional processes.

SUMMARY OF THE INVENTION

The present invention is directed to a mold for forming a golf ball having a core. The mold comprises at least one internal molding cavity for receiving the core. The cavity defines an outer spherical surface. The mold also comprises at least two sets of members associated with each cavity. The first set of members contact a first side of the core and the second set of members contact a second side of the core. Each set further includes at least two, separate parts where each part has at least two projections at a free end for contacting the core. The parts are movable between an extended position where the projections are spaced from the outer spherical surface and contact the core, and a retracted position where the projections form a portion of the outer spherical surface of the cavity.

Preferably, the projections on the parts have a hemispherical shape or form a portion of a hemispherical shape. The parts can be pins or portions of a sleeve.

According to another aspect of the present invention, the inventive mold as discussed above includes at least one internal molding cavity, and at least one pin having a first end, a spaced, second end, and at least two projections at the second end for contacting the core. According to one feature of this invention, each pin has a substantially non-circular cross-sectional shape between the first end and the second end. In one embodiment, the cross-sectional shape of each pin includes at least two substantially circular portions. These circular portions can be overlapping or non-overlapping.

The present invention is also directed to a mold that comprises at least one internal molding cavity for receiving the core, and at least one stationary member associated with each cavity. The member includes at least two projections at a free end, where the projections form a portion of the outer spherical surface of the cavity.

In one embodiment, the stationary member includes a substantially, non-circular cross-section between the free end and a spaced end. In another embodiment, the stationary member includes at least three projections. In this embodiment, the projections are hemispherical in shape. In still another embodiment, the stationary member includes at least one primary vent cutout in the outer surface at the free end, and possibly at least one secondary vent in the outer surface extending from the primary vent.

It is possible that the above-described molds are injection molds and further include at least one runner terminating in at least one gate for flowing a molten material into the cavity; and an injection unit for injecting the molten material through each runner into each cavity.

The present invention is also directed to a method of molding a golf ball comprising the steps of: providing a core; providing at least one internal molding cavity defining an outer spherical surface; providing at least one pin having at least two projections at a free end of each pin for contacting the core; placing the core between the pins so that the core is centered within the cavity; disposing material in the cavity until the material covers the core and forms a layer; and solidifying the material of the layer such that the projections on each pin form corresponding depressions in the layer.

In one embodiment, the pins have hemispherical projections such that the resulting depressions are dimples. In another embodiment, the step of providing the core further includes providing the core with at least one layer of material on a center. In yet another embodiment, the step of providing pins further includes providing non-movable pins or movable pins.

BRIEF DESCRIPTION OF THE DRAWINGS

FIG. 7 is an enlarged, perspective view of the lower mold half of FIG. 6 having a portion broken away for clarity;

FIG. 8 is a partial, enlarged, perspective view of one pin of FIG. 7;

FIG. 9 is a cross-sectional view of the retractable pin along line 9—9 of FIG. 8;

FIG. 10 is an enlarged, perspective view of the golf ball of FIG. 3 as seen from the bottom showing the locations of contact between the retractable pins of FIG. 7 and the ball surface;

FIG. 13 is an enlarged, perspective view of a second embodiment of the lower mold half of FIG. 6 having a portion broken away for clarity;

FIG. 14 is a partial, enlarged, perspective view of one pin of FIG. 13;

FIG. 15 is a cross-sectional view of the retractable pin along line 15—15 of FIG. 14;

FIG. 16 is an enlarged, perspective view of the golf ball of FIG. 3 as seen from the bottom showing the locations of contact between the retractable pins of FIG. 13 and the ball surface;

FIG. 17 is an enlarged, perspective view of a third embodiment of the lower mold half of FIG. 6 having a portion broken away for clarity;

FIG. 18 is a partial, enlarged, perspective view of one pin of FIG. 17;

FIG. 19 is a cross-sectional view of the retractable pin along line 19—19 of FIG. 18;

FIG. 20 is an enlarged, perspective view of the golf ball of FIG. 3 as seen from the bottom showing the locations of contact between the retractable pins of FIG. 17 and the ball surface;

FIG. 25 is a perspective view of a multi-dimple vent pin for use with the mold half of FIG. 23;

FIG. 25A is an enlarged, perspective view of a portion of the pin within the dashed circle 25A of FIG. 25; and FIG. 26 is top view of the vent pin of FIG. 25.

DETAILED DESCRIPTION OF THE PREFERRED EMBODIMENTS

Figure 1:
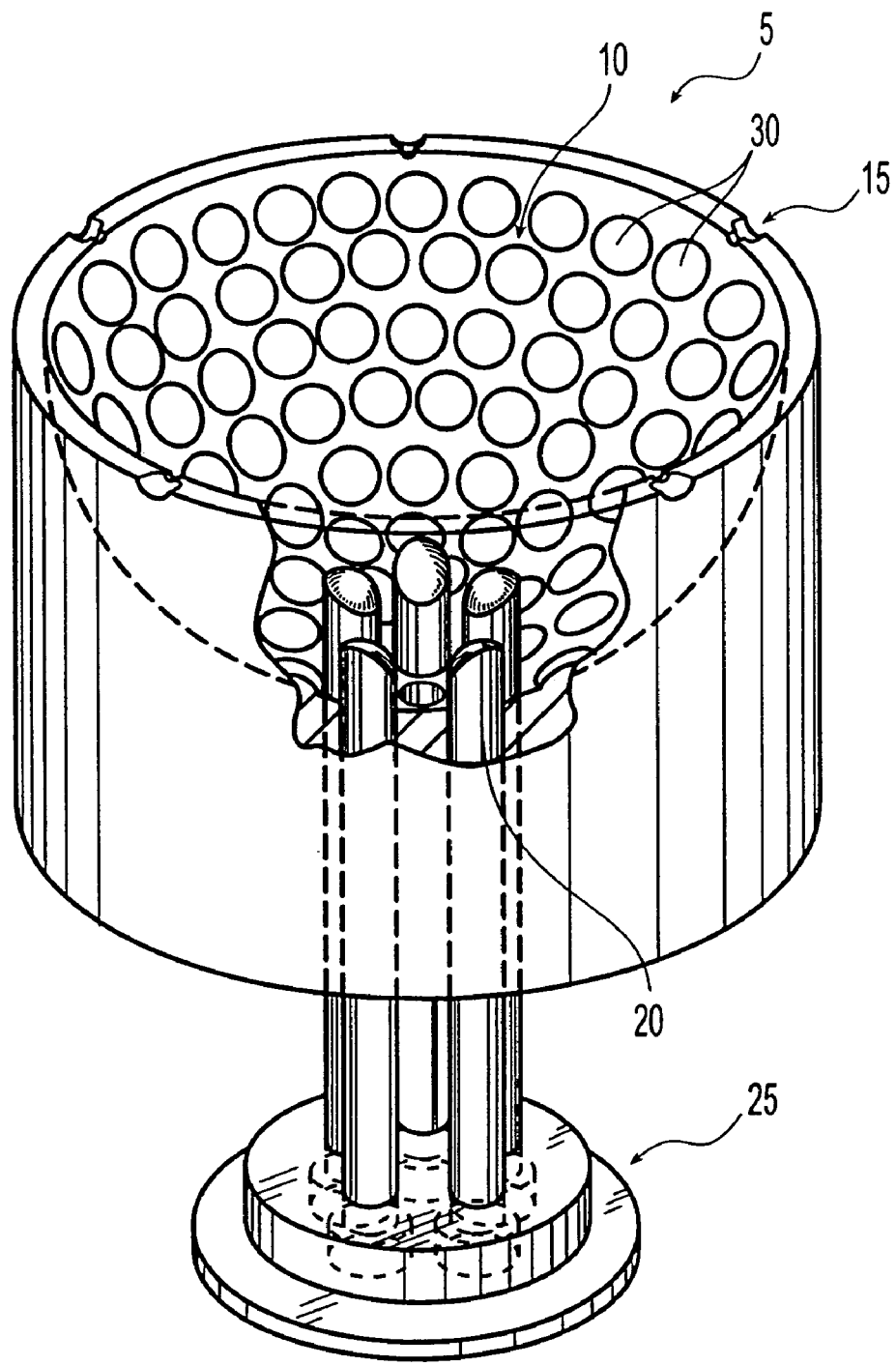
FIG. 1 is an enlarged, perspective view of a lower mold half of a prior art injection mold, wherein a plurality of retractable pins are in an extended position and a portion is broken away for clarity.
Figure 2:
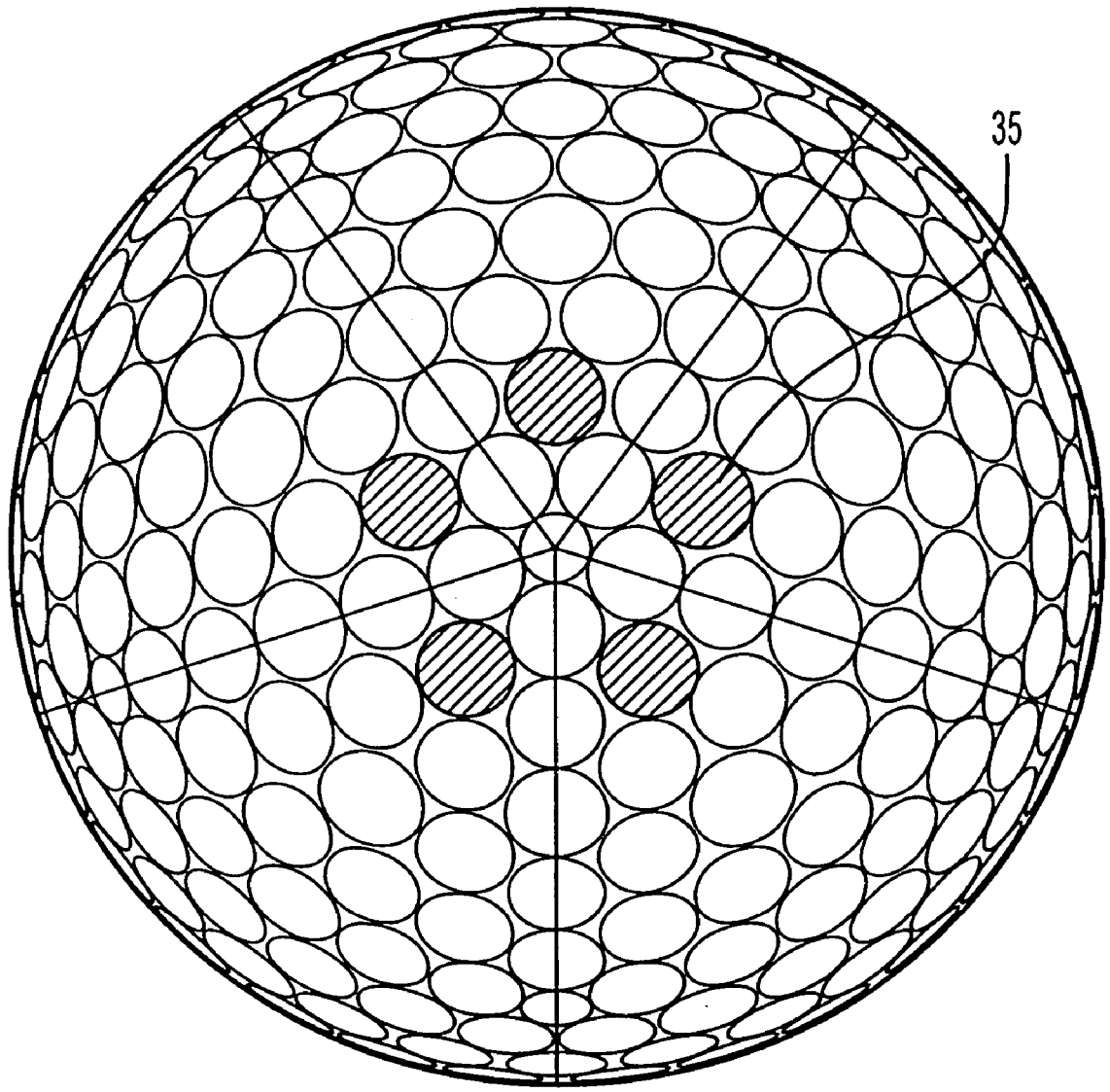
FIG. 2 is a perspective view of a prior art golf ball seen from the bottom showing the locations of contact between the retractable pins of FIG. 1 and the ball surface.
Figure 3:
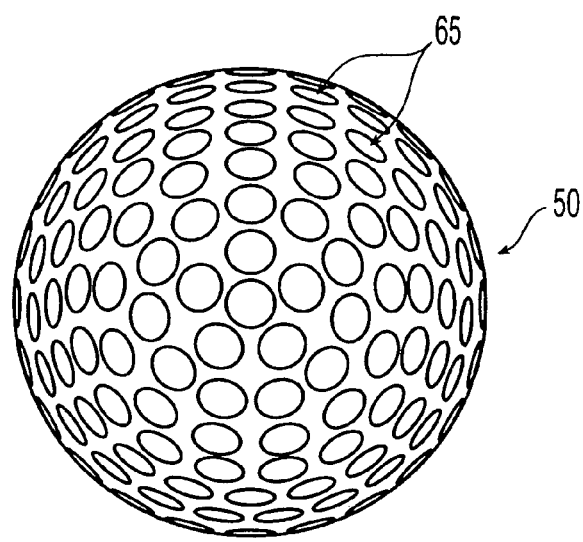
FIG. 3 is a perspective view of a golf ball according to the present invention.
Figure 4:
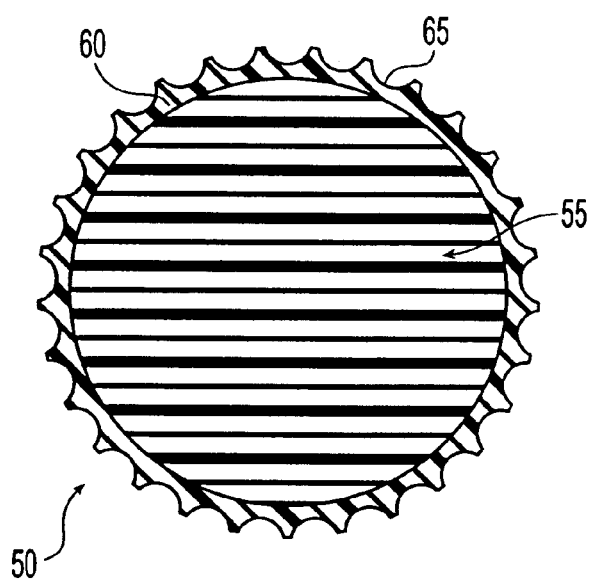
FIG. 4 is a cross-sectional view of the golf ball of FIG. 3.

Referring to FIGS. 3 and 4, this invention is related to a golf ball 50 which comprises a core 55 surrounded by at least one cover layer 60. The cover layer forms the outer surface of the ball which defines dimples 65 therein.

Suitable core materials include thermosets, such as styrene butadiene rubber, polybutadiene, polyisoprene; thermoplastics such as ionomer resins, polyamides or polyesters; or a thermoplastic elastomer. Suitable thermoplastic elastomers include but are not limited to Pebax®, Hytrel®, thermoplastic urethane, and Kraton®, which are commercially available from Elf-Atochem, DuPont, various manufacturers, and Shell, respectively. The core material can also be formed from a castable material. Suitable castable materials include, but are not limited to urethane, polyurea, epoxy, and silicone.

Preferably, the cover 60 is tough, cut-resistant, and selected from conventional materials used as golf ball covers based on the desired performance characteristics. The cover may be comprised of one or more layers. Cover materials can be injection moldable, such as ionomer resins, blends of ionomer resins, thermoplastic urethane, and polyisoprene and blends thereof, as known in the art. However, the present invention is not limited thereto and other materials such as castable resins can also be used.

Figure 5:
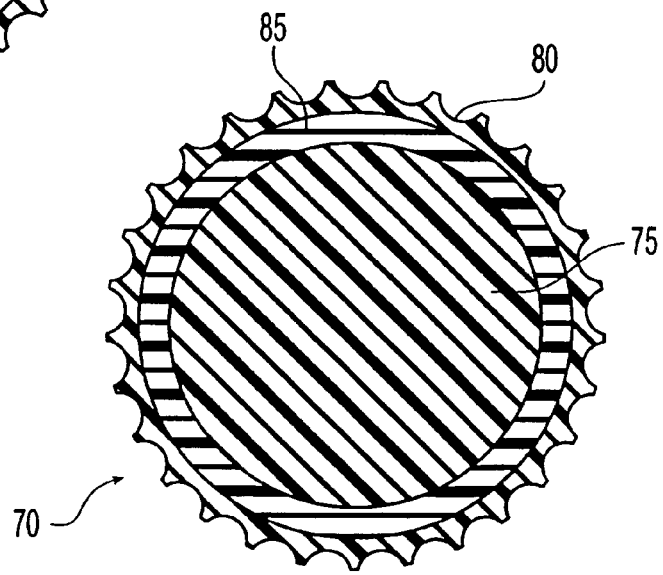
FIG. 5 is a cross-sectional view of another embodiment of a golf ball of the present invention.
Figure 6:
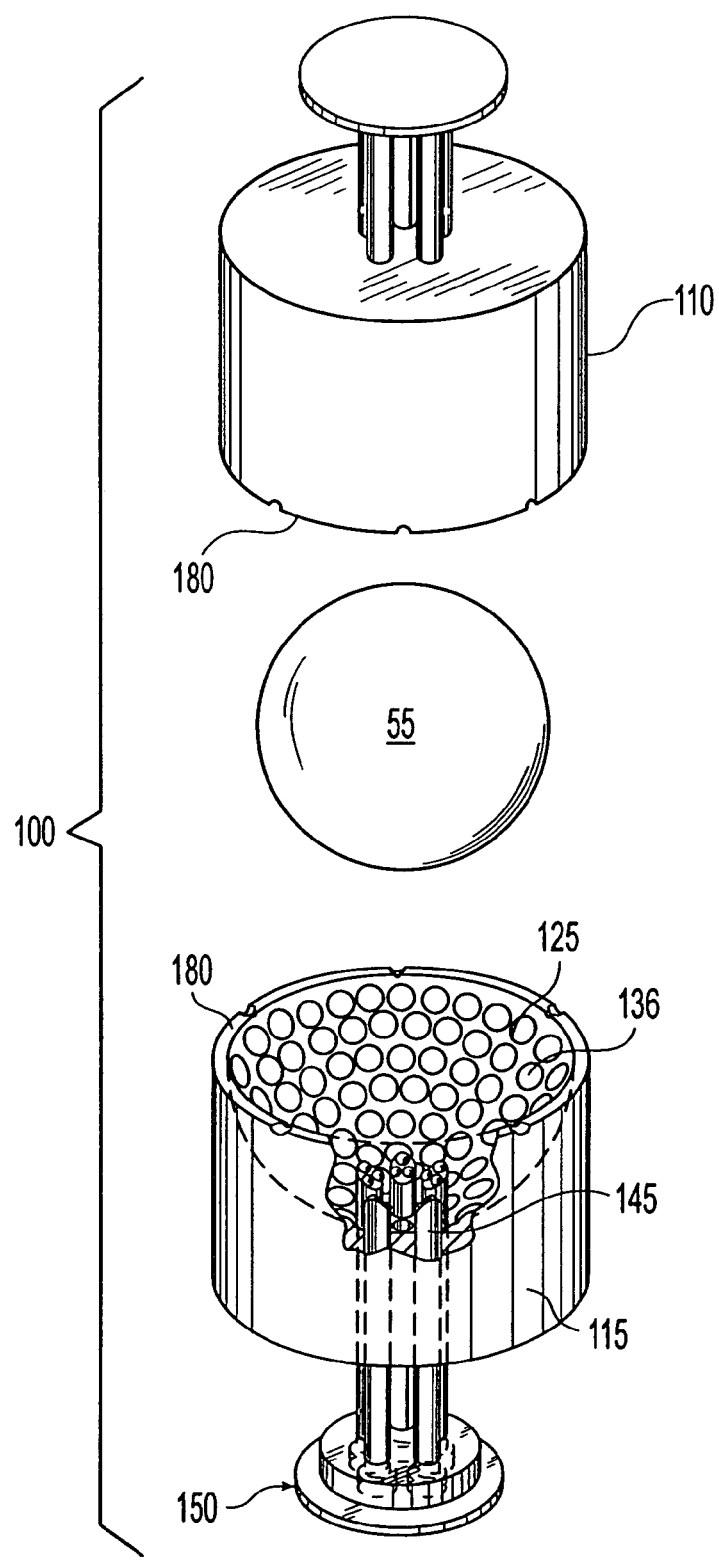
FIG. 6 is an exploded view of upper and lower mold halves of the injection mold of the present invention in an open position with a golf ball core therebetween, wherein the retractable pins are in an extended position.

Referring to FIG. 5, this invention is also related to a golf ball 70 that includes a core 75 surrounded by a cover layer 80, and at least one intermediate layer 85 disposed therebetween. Although the golf balls 50 and 70 are shown with solid cores the present invention can also be used with fluid-filled cores. The fluid within the core can be a wide variety of materials including air, water solutions, liquids, gels, foams, hot-melts, other fluid materials and combinations thereof, as known by those of ordinary skill in the art. The intermediate layer 85 can be formed by molding conventional core, mantle layer or cover layer materials on the core or the intermediate layer can be formed by winding non-elongated or elongated thread on the core. Examples of materials for forming the thread include thermoset materials, synthetic cis-1,4 polyisoprene rubber, natural rubber, blends of synthetic and natural rubber, thermoplastic materials, poly(p-phenylene terephthalamide), natural fibers, glass fiber, mineral fibers such as silicates, vegetable fibers such as cellulosic and animal fibers, or metallic materials. The present invention is not limited to these materials and any material known by those of ordinary skill in the art can be used. In an alternative embodiment, the ball 70 can be formed with any number of intermediate layers formed in any manner. These layers can be solid or wound.

Referring to FIGS. 6–11, this invention is directed to molds, and more specifically injection molds, such as mold 100 that generally includes members that form more than one dimple on a sphere, such as a golf ball. This invention, however, is not limited to injection molds and can be used for example with non-injected materials. The present invention can be utilized with various configurations of molds and dimples, and thus the present invention is not limited to any particular types of molds or dimples shown and discussed below.

The mold 100 according to the present invention includes upper and lower mold halves 110 and 115 located within conventional, top and bottom mold plates (not shown). Each half 110 and 115 defines a hemispherical molding cavity 120 and 125 (best seen in FIG. 11), respectively. The halves 120 and 125 each further include hemispherical outer surfaces 130 and 135, respectively. The hemispherical surfaces 130 and 135 include a plurality of hemispherical projections 136 for forming the majority of the dimples 65 (as shown in FIG. 3) on the ball 50. Although the mold is shown with one pair of upper and lower mold halves forming one spherical cavity, molds can include more than one pair of mold halves to form a plurality of spherical cavities.

Figure 11:
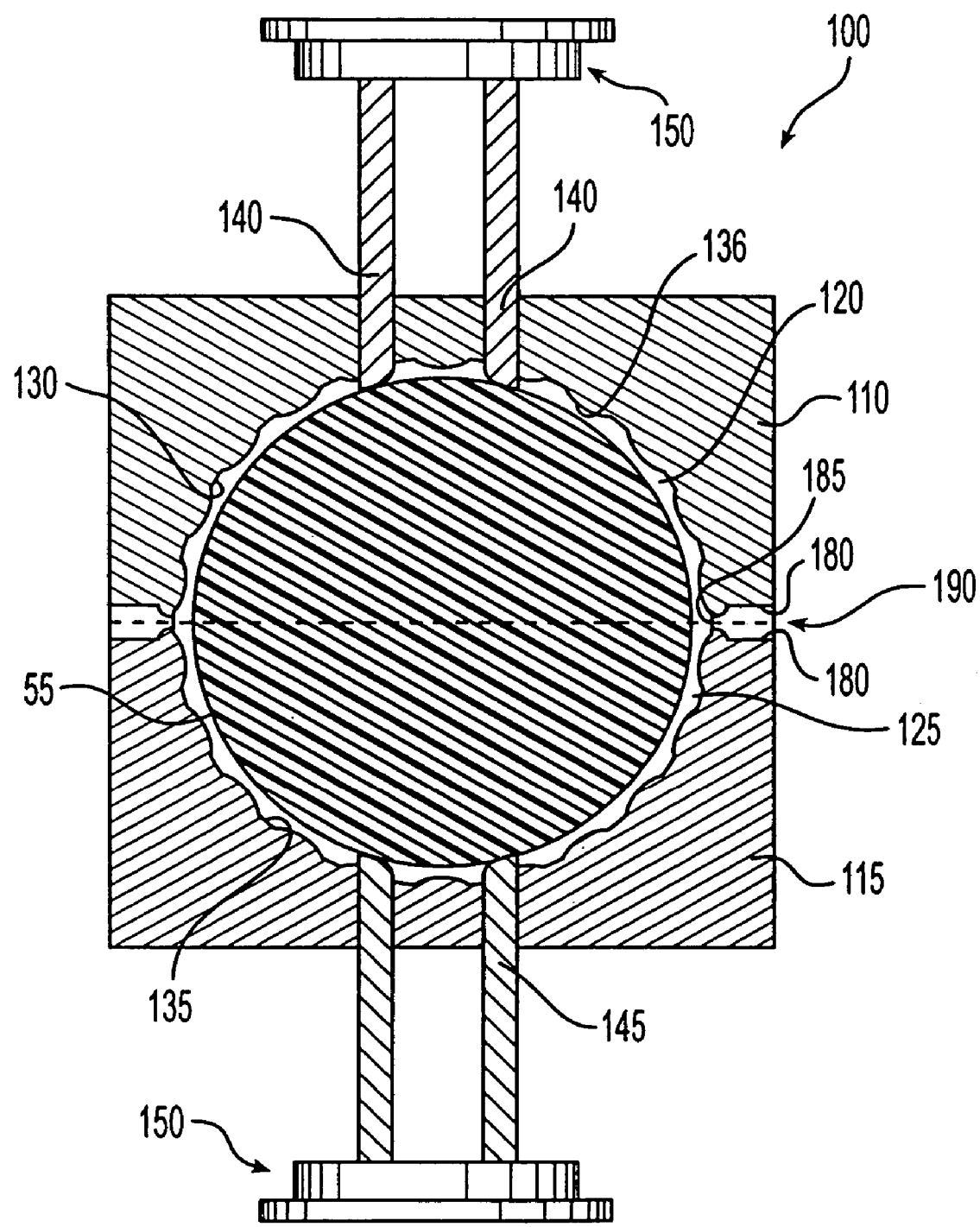
FIG. 11 is a cross-sectional view of the mold halves of FIG. 6 in a closed position, wherein the pins are in an extended position and it is prior to molding a cover.

As best seen in FIGS. 7 and 11, the halves 110 and 115 define bores there through for receiving sets 140 and 145 of separate, retractable pins or members. Each set of pins 140, 145 includes five retractable pins. The sets of pins are coupled together with a cluster block 150. A non-movable, vent pin (not shown) is also used with the mold halves as know by those of ordinary skill in the art.

Referring to FIG. 11, the first set of retractable pins 140 extend from the top half 110 in a first direction into the cavity 120. The second set of retractable pins 145 extend from the bottom half 115 in a second direction opposite the first direction into the cavity 125. The pins of set 140 are aligned with the associated pins of the set 145. In another embodiment, the sets of pins can be unaligned. For example, when molding an icosahedron pattern with 392 dimples, with the appropriate dimple layout three pins can be in each set and the pins of each set can be 180° out of phase with one another.

Referring to FIGS. 7 and 8, free ends 155 of each of the retractable pins in the set 145 have a surface 160, which is planar and angularly offset from the vertical outer surface 170 of the pin. Each pin in the set 145 further includes a plurality of projections 175 extending outwardly from the surface 160. The projections 175 in this embodiment are hemispherical and spaced from one another. The projections have the opposite curvature than the outer spherical surfaces 130, 135 of the cavity lacking the projections 136. There are three projections 175 on each pin, which are arranged in a triangular configuration. Each of the pins in the sets 140 and 145 have a similar configuration. Referring to FIG. 9, each of the pins in the sets 140, 145 has a circular, cross-sectional shape between the ends.

During use, as discussed below, the projections 175 form a plurality of dimples and the surface 160 of the pins without projections 175 is configured to form the land area between dimples. Thus, the tips of the pins are shaped or textured to conform to the radius and negative dimple pattern of the golf ball mold cavity.

Figure 12:
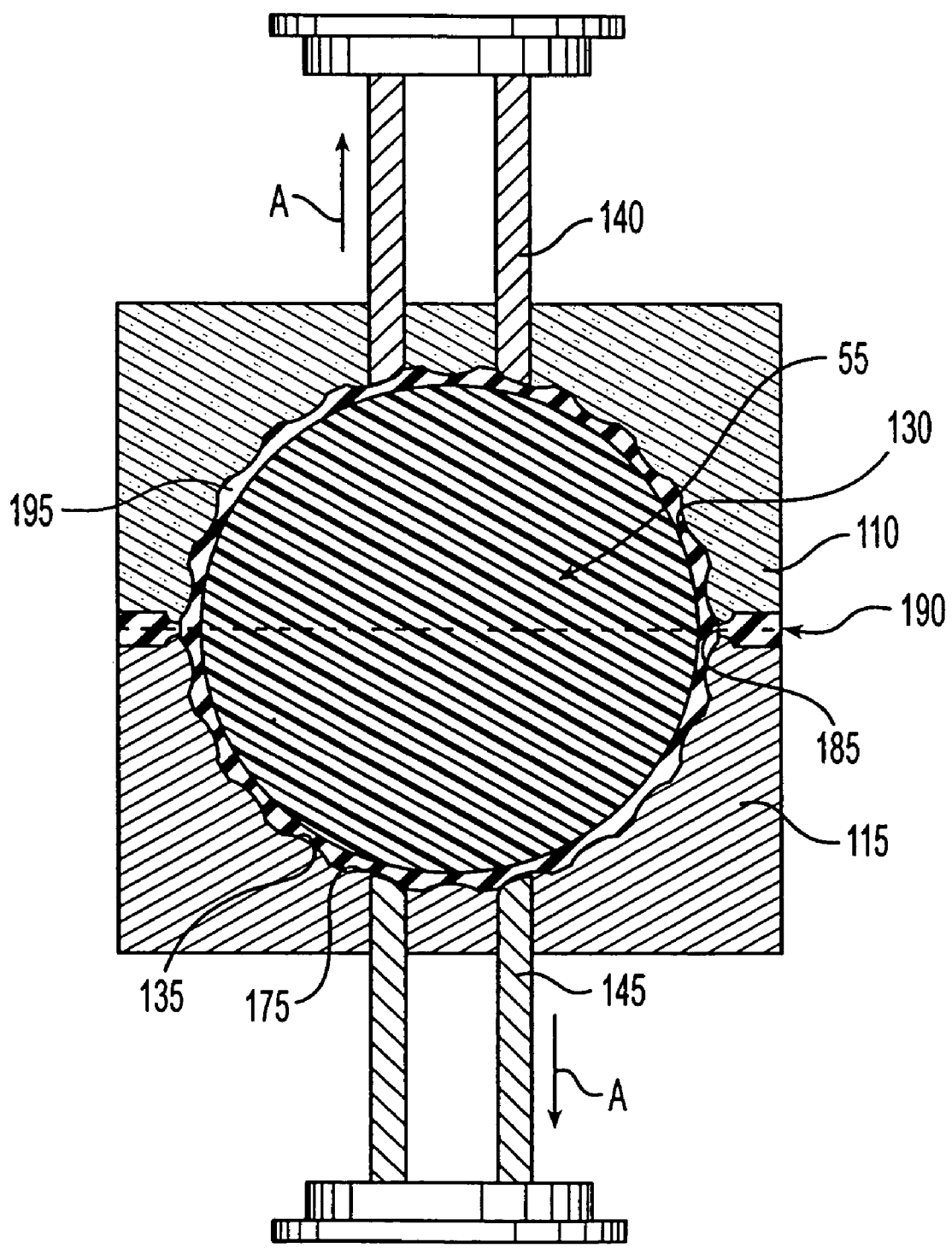
FIG. 12 is a cross-sectional view of the mold halves of FIG. 11 wherein the pins are in a retracted position and it is after molding the cover.

The retractable pins 140, 145 center the golf ball core 55 within the spherical cavity so that the core 55 is spaced from the cavity surfaces 130,135. The retractable pins 140 and 145 are movable between an extended position (as shown in FIG. 11) and a retracted position (as shown in FIG. 12). In the extended position, the projections 175 (as shown in FIG. 8) are spaced from the outer surface 135 of the mold half 115 and contact core 55. In the retracted position, the pins 140 and 145 are flush with the cavity surfaces 130, 135 to form a portion thereof. In the retracted position, the pins 140, 145 are also spaced from the core 55.

Referring again to FIG. 6, the mold halves 110, 115 and top and bottom plates have planar surfaces 180. The halves 110, 115 and top and bottom mold plates move between open and closed positions. In the open position (shown in FIG. 6), the halves and mold plates (not shown) are spaced apart.

Referring to FIG. 11, in the closed position, the surfaces 180 of the halves 110, 115 and mold plates are in contact except at gates 185. In this position, the hemispherical cavities 120, 125 form an internal, spherical molding cavity. Runners or passages 190 are formed between the halves and the plates. The runners 190 terminate at the outer surfaces 130, 135 of the halves at gates 185. The gates 185 are openings through which molten material enters the spherical cavity from the runners 190.

Now, the operation of the apparatus will be discussed with reference to FIGS. 11 and 12. With the pins 140 and 145 in the extended position, the core 55 is placed between the pins 140 and 145 so that the core is centered within the cavities 120, 125. An injection unit (not shown) forces the molten material 195 into the spherical cavity. This continues until enough of the molten material has been injected to cover the core 55. After the molten material 195 contacts the core 55, the pins 140 and 145 are retracted in the direction of the arrows A. Retraction continues until the projections 175 (best seen in FIG. 8) form a portion of the spherical surfaces 130, 135. Then, the molten material 195 is solidified to define the cover layer 60 (as shown in FIG. 4).

Once the cover layer is formed, it can be seen in FIG. 10, where the retractable pins 145 contact the ball 50 about the lower pole P. The contact areas of the pins is shaded within the circle C. The diameter of the contact circle $d_C$ is equal to the diameter of each pin $d_P$ (as shown in FIG. 9). The projections 175 are within the contact circle C and form the non-overlapping dimples 200, 205, and 210. Within each contact area, where the pins 145 contact the ball, three dimples are formed by the projections on the end of each pin.

The total surface area of the free ends of all of the pins is less than about 10% of the ball surface area. This total surface area is calculated using the surface area of the projections for each pin combined. More preferably, the total surface area of the free ends of all of the pins is less than or equal to about 5% of the ball surface area. In a ball with a 300 dimple pattern with about 70% dimple coverage of the ball surface area, if four dimples are formed by two pins with two projections each, the total surface area of the pins free ends is about 1% of the ball surface area. In a ball with a 500 dimple pattern with about 80% dimple coverage of the ball surface area, if thirty dimples are formed by ten pins with three projections each, the total surface area of the pins free ends is about 5% of the ball surface area. The above calculations based on dimples assume that the all of the dimples have the same diameter.

Referring to FIG. 8, thus the projections 175 form dimples in the cover and the remaining area of the free ends 160 forms land area of the ball about the dimples. The pins 140 (as shown on FIG. 11) similarly contact the ball at an upper pole to form groups of dimples there about.

Referring to FIGS. 7, 10, and 11, preferably, the pins 140, 145 are for use in forming a ball with a dimple pattern of which at least two dimples and surrounding land area are within the contact circle C without bisecting any adjacent surrounding dimples. In the dimple pattern on ball 50, three dimples 200, 205, and 210 are within contact area C. In another embodiment, at least two projections can be formed on each pin such projections form dimples and bisect and/or contact dimples outside a contact circle.

Referring to FIGS. 13 and 14, an alternative embodiment of a lower mold half 215 is shown. The mold half 215 includes a set of retractable pins 245 slidable therethrough. Each pin 245 in set includes a planar free end surface 260 having outwardly extending projections 275a, 275b, and 275c thereon. The projections 275a–c are spaced from one another. The projections 275a and 275b are shaped like half of a hemisphere. The projection 275c is shaped like a complete hemisphere. The pins 245 have a circular diameter $d_P$ (as shown in FIG. 15). The lower mold half 215 is used with a similarly configured upper half, as disclosed above to form the cover layer on ball 280 (as shown in FIG. 16).

Referring to FIGS. 13–16, the contact area of the pins 245 is shaded and within the contact area circle C. The diameter of the contact area $d_C$ is equal to the diameter of each pin $d_P$. The other pins in the upper half similarly contact the ball at an upper pole. The partial projection 275a forms a portion of the dimple 300. The partial projection 275b forms a portion of the dimple 305. The completely hemispherical dimple 275c forms the entire dimple 310 (shown in phantom). The remaining portions of the dimples 300 and 305 not formed by the pins are formed by projections on the outer surface of the mold half 215. Thus, in the dimple pattern on ball 280, the contact area C bisects dimples 300 and 305. The remaining surface of end surface 260 forms the land area between dimples.

Referring to FIGS. 17 and 18, a preferred embodiment of a lower mold half 415 is shown. The mold half 415 includes a set of retractable pins 445 slidable therethrough. Each pin 445 in the set includes three substantially cylindrical portions 445a–c (as best shown in FIG. 19) so that the cross-sectional shape of the pins between its ends is non-circular. Since the cross-section of each portion 445a–c is a non-overlapping circle, the cross-sectional area of each pin has a substantially three-leaf, clover shape between the ends. The perimeter of each pin is indicated as P. The bore through the mold halves for use with pins 445 have the same clover shape as the pin perimeter P to allow passage of the pins therethrough. The bores can be formed by either conventional or wire electrical discharge machining. The bores can alternatively be formed by other processes such as milling, honing and drilling, but the present invention is not limited to formation be the above-mentioned processes. The dimensions of the bores and pins can be selected as known by those of ordinary skill in the art to allow the necessary sliding fit and the minimize flash.

Each pin with a non-circular cross-sectional shape includes at least two substantially circular portions. When three substantially circular portions form the cross-sectional shape, these portions can be arranged in various ways depending on the dimples being formed and the dimple pattern. For example, the circular portions can be arranged in a line or triangle, but the present invention is not limited to these arrangements. When four substantially circular portions form the cross-sectional shape, these portions can be arranged in various ways depending on the dimples being formed and the dimple pattern. For example, the circular portions can be arranged in a line, triangle, or rectangle but the present invention is not limited to these arrangements. Thus, the perimeter of the pins can have any desired shape. Furthermore, these portions can be overlapping or non-overlapping. It is preferable that the perimeter of the pin corresponds to the dimple projections thereon.

Each portion 445a–c of each pin 445 in the set includes a substantially hemispherical projection portion 475a–c. The general shape of the pins 445 are formed then the projections are machined thereon.

Each projection 475a–c has an apex labeled A1-A3, respectively. The apex A1 of projection 475a defines a reference plane R. The other portions 445b and 445c of each pin are formed so that the apex A2 of projection 475b is below the reference plane R and apex A3 of projection 475c is above the reverence plane R. As a result, the apex of each pin is at a different vertical position.

Of all the embodiments shown, the pins 445 are preferable, because their cross-sectional shape or shape of perimeter P allows these pins to be used with any dimple pattern without bisecting or contacting dimples outside shaded, contact area outlined by C (as shown in FIG. 20) on ball 550. The shape of contact area conforms to the outline of adjacent dimples. Thus, pins 445 can be used with conventional dimple patterns based on an icosahedron, cuboctahedron or the like.

Figure 20A:
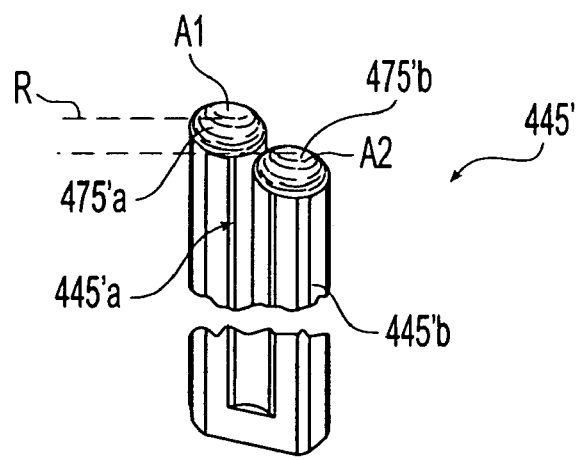
FIG. 20A is a partial, enlarged, perspective view of another embodiment of a pin of the present invention.

Referring to FIG. 20A, another embodiment of a pin 445' is shown. This pin is used in sets with lower and upper mold halves, as discussed above. Pin 445' includes two substantially cylindrical portions 445'a–b so that the cross-sectional shape of the pin between its ends is non-circular. The cross-section of each portion 445'a–b is a non-overlapping circle. Each portion 445'a–b of each pin 445' further includes a substantially hemispherical projection portion 475'a–b at the free end. The bore through the mold halves for use with pin 445' has the same non-circular cross-sectional shape as the perimeter of the pin. The pins 445' and the bores are formed as discussed above with respect to FIGS. 17–19.

Each projection 475'a–b has an apex labeled A1–A2, respectively. The apex A1 of projection 475'a defines a reference plane R. The other portion 445'b of pin 445' is formed so that the apex A2 of projection 475'b is below the reference plane R. As a result, the apex of each pin is at a different vertical position.

Figure 20B:
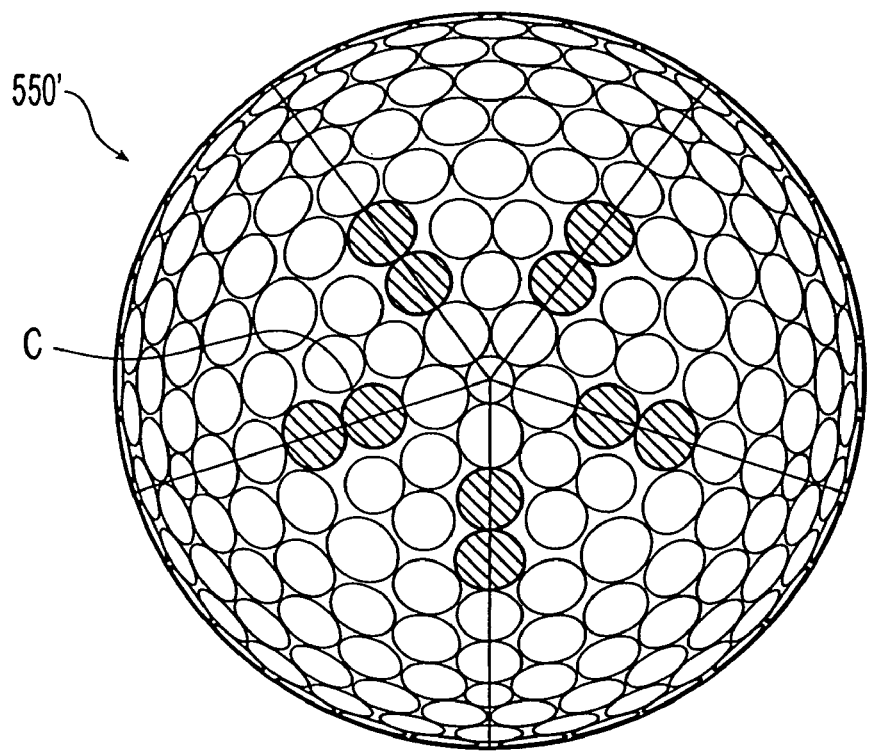
FIG. 20B is an enlarged, perspective view of the golf ball of FIG. 3 as seen from the bottom showing the locations of contact between the retractable pins formed like the pin shown in FIG. 20A and the ball surface.

Pins 445' have a cross-sectional shape or perimeter shape that allows these pins to contact dimples without bisecting dimples as shown by contact area outlined by C (as shown in FIG. 20B) on ball 550'. The shape of contact area conforms to the outline of adjacent dimples. As shown by the contact areas on ball 550' in this embodiment, the dimple pattern is readily useful with five pins about the pole, however a different number of pins can be used. With another dimple pattern the pin 445' can be configured to bisect dimples or form other groups of dimples on the ball.

Figure 21:
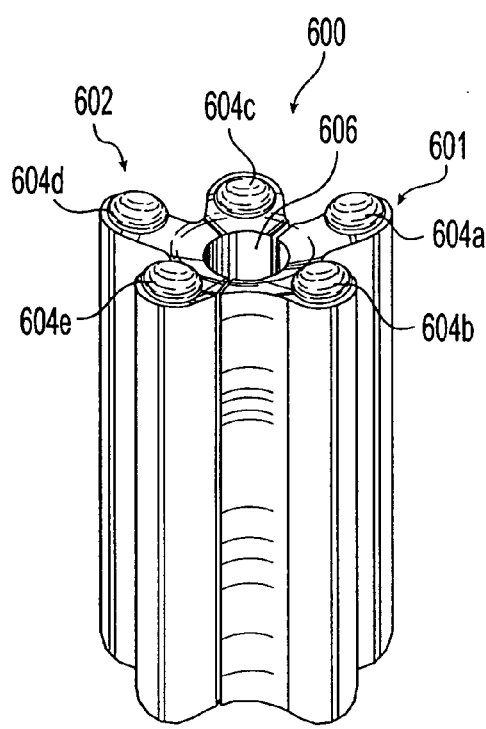
FIGS. 21 and 22 are perspective views of various alternative embodiments of retractable members according to the present invention.
Figure 21A:
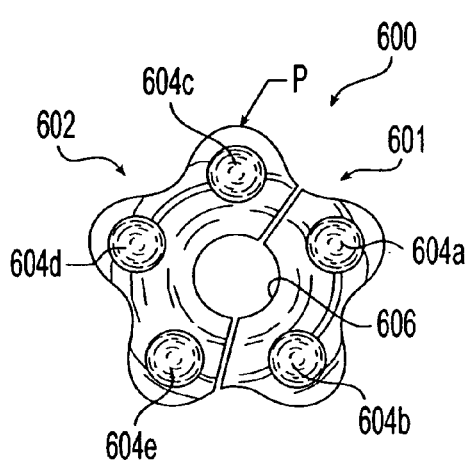
FIGS. 21A and 22A are top views of the retractable members shown in FIGS. 21 and 22, respectively.

Referring to FIG. 21, a substantially annular, retractable member 600 includes two segments 601 and 602 that are mated in use. The member 600 is for use with mold halves similar to those shown in FIG. 6, but modified to receive the member 600. The segment 601 has two dimple projections 604a–b formed on the free end. The segment 602 has three dimple projections 604c–e formed on the free end. As best seen in FIG. 21A, the perimeter P of member 600 is spaced from the dimple projections 604a–e. The member 600 has a non-circular cross-sectional shape. A vent pin (not shown) and optionally a core pin are received within the bore 606 formed through the member 600. In use, member 600 is slidably engaged with the upper and lower mold halves and coupled together with a cluster block. Thus, each member 600 and 602 forms a plurality of dimples during molding similar to the embodiments discussed above.

Figure 22:
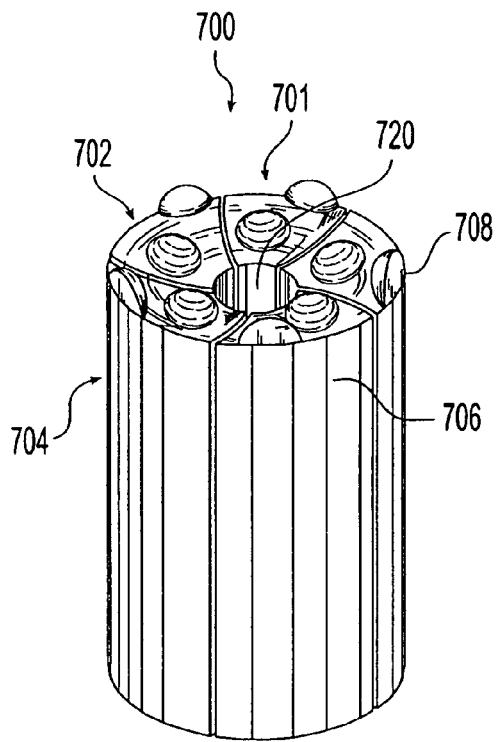
Figure 22A:
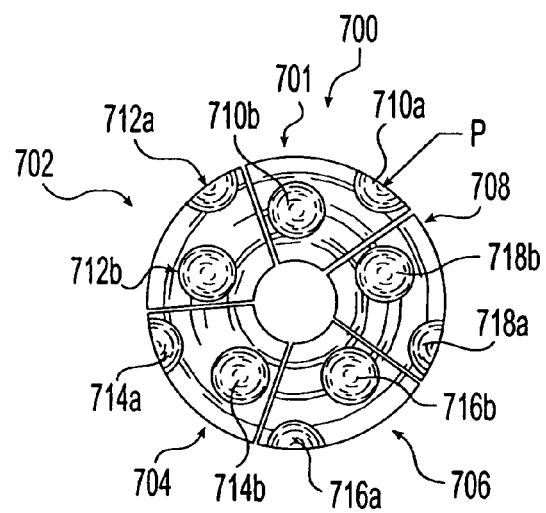

Referring to FIGS. 22 and 22A, a substantially annular, retractable member 700 includes a plurality of segments 701, 702, 704, 706, and 708. The member 700 is for use with mold halves similar to those shown in FIG. 6, but modified to receive the member 700. These modifications can include forming features in the mold half and the member to properly locate the member in the mold half. The segment 701 has two dimple projections 710a–b formed on the free end. The projection 710a is semi-hemispherical and the projection 710b is hemispherical. The members 702-708 also each have two dimple projections 712a–b, 714a–b, 716a–b, and 718a–b, respectively, formed on the free end. The projections 712a–b, 714a–b, 716a–b, and 718a–b are formed similar to the projections 710a–b. As best seen in FIG. 22A, the perimeter P of the member 700 intersects dimple projections 710aa–718b. The perimeter P is spaced from the dimple projections 710b–718b. A vent pin (not shown) and optionally a core pin are received within the bore 720 formed through the member 700. The member 700 has circular cross-sectional shape. In use, the member 700 is slidably engaged with the upper and lower mold halves and coupled together with a cluster block. Thus, each member 700–708 forms a plurality of dimples during molding similar to the embodiments discussed above.

Figure 23:
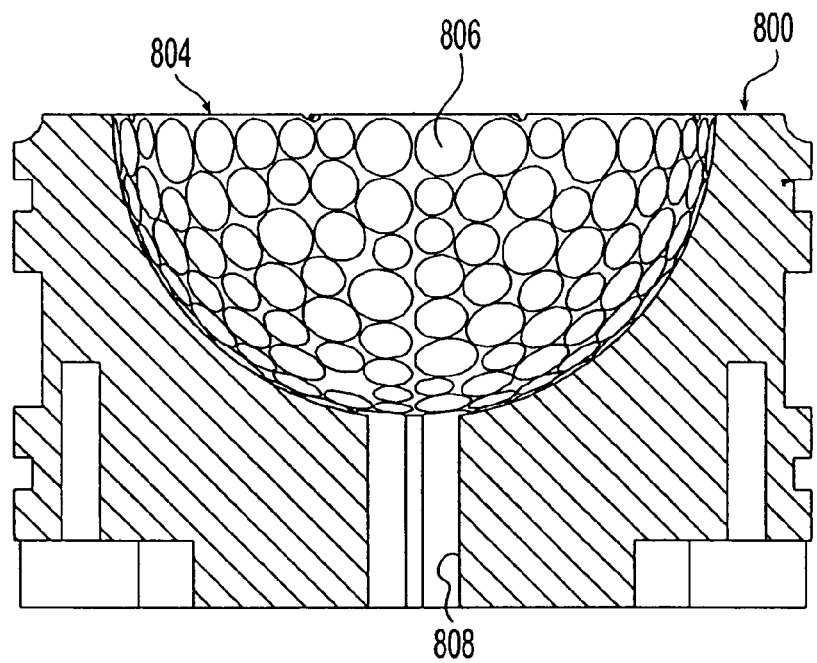
FIG. 23 is an enlarged, cross-sectional view of another embodiment of a lower mold half of the present invention.
Figure 24:
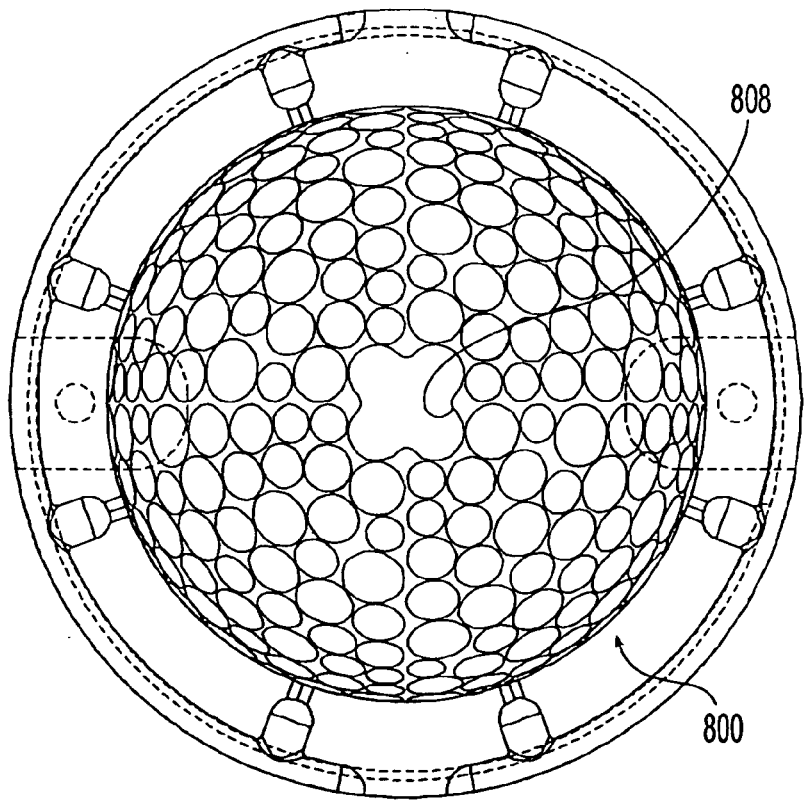
FIG. 24 is a partial, top view of the lower mold half shown in FIG. 23 inserted into a bottom mold plate.

Turning to FIGS. 23–25, an alternative embodiment of a mold half 800 and vent pin 802 according to the present invention is shown. The mold half 800 defines a hemispherical cavity 804 with a plurality of dimple projections 806 formed thereon. The mold half 800 further defines a bore 808 for receiving the vent pin 802.

Referring to FIGS. 25 and 26, vent pin 802 includes a plurality of substantially cylindrical segments 810a–d that are joined together so that the cross-sectional shape of the pin 802 between the ends along the cylindrical segments 810a–d is non-circular. The four segments form generally a rectangle. Each of the segments 810a–d includes a projection 812a–d, respectively extending outwardly from the free end. An optional bore 814 is disposed within a centrally area between the projections 812a–d. Alternatively to the bore, the vent pin can be split. The projections 812a–d, in this embodiment, are hemispherical and spaced from one another. The projections 812a–d are also spaced from the perimeter P of the pin 802. In use, the projections 812a–d are used to form indentations in the shape thereof during molding, be it in a cover or in an intermediate layer.

Each pin 802 further includes at least one primary vent 816 and at least one secondary vent 818 in fluid communication therewith in the outer surface of the pin. In this embodiment, each segment 810a–d includes three primary vents 816 disposed along the perimeter of the pin 802 at the free end. Each segment 810a–d also includes three secondary vents 818 extending from the associated primary vent 810a–d downward. The primary vents 816 are cutouts and the secondary vents 818 are flat segments in the otherwise curved surface of the pin. The secondary vents 818 form clearance spaces between the wall of the bore 808 (as shown in FIG. 24) and the pin that allow trapped gases during the molding process to escape the cavity.

Preferably, as shown in FIGS. 25 and 25A, the primary vents 816 have a depth d1 less than the depth d2 of the secondary vents 818. More preferably, the depth of the primary vents 816 is less than about 0.005 inch and the depth of the secondary vents 818 is greater than about 0.005 inch. Most preferably, the depth of the primary vents 816 is between about 0.0005 and about 0.002 inch and the depth of the secondary vents 818 is between about 0.005 and about 0.010 inch.

The geometry of the vent pin can be varied, as discussed with respect to the retractable members, such that for example the dimples are non-hemispherical in shape or so that the cross-sectional shape of the vent pin is circular. Furthermore, the vent pin 802 can be used in combination with the various retractable pin and sleeve embodiments discussed above.

When golf balls are prepared according to the invention, they typically will have dimple coverage greater than about 60 percent, preferably greater than about 65 percent, and more preferably greater than about 70 percent. The flexural modulus of the cover on the golf balls, as measured by ASTM method D-790, is typically greater than about 500 psi, and is preferably from about 500 psi to 150,000 psi. The hardness of the cover is typically from about 35 to 80 Shore D, preferably from about 40 to 78 Shore D, and more preferably from about 45 to 75 Shore D.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100.

In other embodiments, the mold can include various combinations of retractable elements depending on the dimple pattern and flow characteristics of the material. For example, the mold can include two sets of retractable pins of the present invention associated with each mold half, where the pins on one half are about 90° out of phase with the other pins to securely hold the core in the center of the cavity. In another embodiment, the pins of the present invention can be used with one mold half and an annular retractable member such as shown in FIGS. 21 and 22 can be used with the other mold half. In this embodiment, it is preferable that the annular, retractable member be used with the lower mold half so that it can eject the core. Alternatively, the pins or annular, retractable members of the present invention can be used in combination with the sleeves disclosed in U.S. Pat. No. 6,129,881 issued Oct. 10, 2000, entitled "RETRACTABLE SLEEVE FOR INJECTION MOLDING," which is incorporated by reference herein in its entirety.

While it is apparent that the illustrative embodiments of the invention herein disclosed fulfill the objectives stated above, it will be appreciated that numerous modifications and other embodiments may be devised by those skilled in the art. The process applies to forming the cover layer and/or any intermediate layers between the core and cover. After one layer is formed and solidified according to the method of the present invention additional layers can be formed.

Thus, the invention is equally applicable to any or all molding processes for thermoplastic and other material layers in multilayer component golf balls. Specifically in solid, three piece balls where the intermediate layer and cover are injection molded. In the present invention, the general principles of the invention can be used with any dimple patterns by configuring the pins to match the dimple pattern. For example, the present invention can be used with golf balls having an icosahedron pattern, octahedron pattern, quadrilateral pattern, a cuboctahedron pattern, or a dodecahedron pattern. Another dimple pattern that can be used involves dividing the ball along equally spaced longitudinal lines to form segments of the ball shaped like orange slices. There are usually 5 or 6 such segments and the same dimple pattern is repeated within each segment. The present invention is not limited to golf balls having the above-identified patterns and can be used with other less common dimple patterns. The number of pins or segments of annular, retraction members in each embodiment can be varied as needed. The perimeter of the pins or annular, retractable members may intersect one on more dimples in the various embodiments. Furthermore, the projections on the pins are not limited to the hemispherical or semi-hemispherical shapes. For example, the projections can be configured so that they produce dimples shaped like octagons, squares, ellipses, hemispheres with different sections with different radii, or saucer-shaped. Saucer-shaped dimples have a flattened bottom wall and steeper sides than conventional dimples. Additionally, the present mold or method can be used with compression molding, liquid or reaction injection molding techniques or other conventional techniques used with the materials disclosed above. In addition, the features of one embodiment can be used with the features of any other embodiment. Therefore, it will be understood that the appended claims are intended to cover all such modifications and embodiments which come within the spirit and scope of the present invention.

What is claimed is:

1. A mold for forming a golf ball having a core, the mold comprising:
   (a) a first mold plate having at least one first hemispherical cavity and a first set of members for contacting a first side of the core, wherein the first set of members comprise at least two, separate pins each comprising at least two projections at a free end for contacting the core;
   (b) a second mold plate having at least one second hemispherical cavity and a second set of members for contacting a second side of the core, wherein the second set of members comprise at least two, separate pins each comprising at least two projections at a free end for contacting the core,
   wherein upon mating the first mold plate with the second mold plate, each first hemispherical cavity and each second hemispherical cavity form a molding cavity for receiving the core, wherein the molding cavity defines an outer spherical surface,
   wherein
   each pin of the first and second members is movable between an extended position where the at least two projections are spaced from the outer spherical surface and contact the core, and a retracted position where the projections form a portion of the outer spherical surface of the cavity, and wherein each pin of the first set of members is unaligned with each pin of the second set of members.

2. The mold of claim 1, wherein the projections are hemispherical in shape.

3. The mold of claim 1, wherein each pin of the first set of members is 180° out of phase with each pin of the second set of members.

4. The mold of claim 1, wherein each set of members comprises at least five projections.

5. The mold of claim 1, wherein the projections on each pin are spaced from one another.

6. The mold of claim 1, wherein the projections on each pin are spaced from the perimeter of the member.

7. The mold of claim 1, further comprising at least one runner terminating in at least one gate for flowing a molten material into the cavity; and an injection unit for injecting the molten material through each runner into each cavity.

8. A mold for forming a golf ball having a core, the mold comprising:
  (a) at least one internal molding cavity for receiving the core; and
  (b) at least one pin having a first end, a spaced, second end, and at least two projections at the second end for contacting the core, each pin has a non-circular cross sectional shape between the first end and the second end, and wherein the cross-sectional shape comprises at least two substantially circular portions.

9. The mold of claim 8, wherein the cross-sectional shape comprises four substantially circular portions arranged in a line triangle, or rectangle.

10. The mold of claim 8, wherein the cross-sectional shape comprises three substantially circular portions arranged in a line or triangle.

11. The mold of claim 8, further comprising at least one first pin and at least one second pin diametrically opposed to the first pin.

12. The mold of claim 8, wherein the at least one molding cavity further defines an outer spherical surface, and the pins are movable between an extended position where the projections are spaced from the outer spherical surface and a retracted position where the projections form a portion of the outer spherical surface.

13. The mold of claim 8, wherein each pin projection has a hemispherical shape with an apex and the apex of each pin is at a different vertical position than the remaining apexes.

14. The mold of claim 8, further comprising at least one runner terminating in at least one gate for flowing a molten material into the at least one molding cavity; and an injection unit for injecting the molten material through each runner into each cavity.

15. A mold for forming a golf ball having at least a core, the mold comprising:
  (a) at least one internal molding cavity for receiving the core, the cavity defining an outer spherical surface; and
  (b) at least one stationary member associated with each cavity, each comprising at least two projections at a free end where the projections form a portion of the outer spherical surface of the cavity and a non-circular cross-section between the free end and a spaced end.

16. The mold of claim 15, wherein the non-circular cross-section comprises at least two substantially circular portions.

17. The mold of claim 15, wherein the at least one stationary member comprises at least three projections.

* * * * *